United States Patent
Tomizawa et al.

(10) Patent No.: US 10,086,666 B2
(45) Date of Patent: Oct. 2, 2018

(54) COUPLING STRUCTURE FOR VEHICLE CHASSIS MEMBERS

(71) Applicant: SUBARU CORPORATION, Tokyo (JP)

(72) Inventors: Hidehisa Tomizawa, Tokyo (JP); Toshi Ishida, Tokyo (JP); Hajime Terasaki, Tokyo (JP); Yoshiaki Utsugi, Tokyo (JP); Masaru Kogure, Tokyo (JP); Yuichiro Tsukasaki, Tokyo (JP); Toshiyuki Hyuga, Tokyo (JP); Noritaka Hayashi, Tokyo (JP); Kensuke Ohshima, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 0 days.

(21) Appl. No.: 14/860,418

(22) Filed: Sep. 21, 2015

(65) Prior Publication Data
US 2016/0089943 A1 Mar. 31, 2016

(30) Foreign Application Priority Data
Sep. 26, 2014 (JP) .................................. 2014-196790

(51) Int. Cl.
*B60G 7/00* (2006.01)
*F16C 11/06* (2006.01)
(Continued)

(52) U.S. Cl.
CPC ............ *B60G 7/005* (2013.01); *B60G 7/001* (2013.01); *F16B 3/00* (2013.01);
(Continued)

(58) Field of Classification Search
CPC ..... Y10T 403/32631; Y10T 403/32155; Y10T 403/32196; Y10T 403/32204;
(Continued)

(56) References Cited

U.S. PATENT DOCUMENTS 2,752,178 A * 6/1956 Hoffman ................ B60G 7/005
280/93.512
3,010,746 A * 11/1961 Melton .................... B62D 7/16
280/93.508
(Continued)

FOREIGN PATENT DOCUMENTS

JP S48-41706 U 5/1973
JP 2-200508 A 8/1990
(Continued)

OTHER PUBLICATIONS

Decision to Grant issued in corresponding Japanese Patent Application No. 2014-196790, dated Sep. 6, 2016.
(Continued)

*Primary Examiner* — Josh Skroupa
*Assistant Examiner* — Cory B Siegert
(74) *Attorney, Agent, or Firm* — McDermott Will & Emery LLP (57) ABSTRACT

A coupling structure for vehicle chassis members couples a ball joint member and an axle housing used for a vehicle to each other. The structure includes a socket that has a substantially columnar external shape, is provided in the ball joint member, and has a socket bolt groove throughout a circumference in an outer circumferential surface of the socket. The structure also includes a collar that has a substantially cylindrical shape and is disposed so as to surround an outer circumferential surface of the socket. The axle housing has a coupling hole having a substantially columnar internal shape into which the socket is inserted. The ball joint member and the axle housing are coupled to each other by disposing the socket in the coupling hole while the socket is surrounded by the collar.

18 Claims, 7 Drawing Sheets

(51) Int. Cl.
*F16B 3/00* (2006.01)
*F16B 21/16* (2006.01)

(52) U.S. Cl.
CPC .... *B60G 2204/416* (2013.01); *B60G 2206/10* (2013.01); *F16B 21/16* (2013.01); *F16C 11/0695* (2013.01); *Y10T 403/32155* (2015.01); *Y10T 403/32737* (2015.01)

(58) Field of Classification Search
CPC ........... Y10T 403/46; Y10T 403/32032; Y10T 403/32311; Y10T 403/32639–403/32811; Y10T 403/7039; Y10T 403/7058; B60G 7/001; B60G 7/005; B60G 2204/416; B60G 2206/10; F16C 11/0623; F16C 11/0695; F16C 11/106; F16C 11/06–11/086; F16B 3/00; F16B 21/16; F16B 21/09; B62D 7/16
USPC ......... 403/56, 71, 76, 77, 90, 122, 123–144, 403/230
See application file for complete search history.

(56) References Cited

U.S. PATENT DOCUMENTS

| | | | | |
|---|---|---|---|---|
| 3,385,129 A | * | 5/1968 | Duncan | G05G 1/12 292/350 |
| 3,796,464 A | * | 3/1974 | Hansen | E21C 35/1933 299/104 |
| 4,220,418 A | * | 9/1980 | Kondo | B62D 7/18 277/391 |
| 4,372,703 A | * | 2/1983 | Szostak | B25G 3/18 403/324 |
| 4,758,110 A | * | 7/1988 | Ito | F16C 11/0638 403/122 |
| 4,984,930 A | * | 1/1991 | Connor | F16C 11/0604 403/122 |
| 5,195,605 A | * | 3/1993 | Wood | B60K 17/306 180/254 |
| 5,611,635 A | * | 3/1997 | Schutt | F16C 11/0638 403/122 |
| 5,647,686 A | * | 7/1997 | Hancock | B62D 1/16 403/328 |
| 6,231,264 B1 | * | 5/2001 | McLaughlin | F16C 11/0614 180/352 |
| 8,277,142 B2 | * | 10/2012 | Hoshino | B62D 1/16 403/315 |
| 2008/0213035 A1 | * | 9/2008 | Scheper | B60G 7/005 403/127 |
| 2013/0340403 A1 | * | 12/2013 | Anand | C23C 30/00 60/39.52 |

FOREIGN PATENT DOCUMENTS

| | | | | |
|---|---|---|---|---|
| JP | 06-115331 A | | 4/1994 | |
| JP | 11-208230 A | | 8/1999 | |
| JP | 11208230 A | * | 8/1999 | ............... B60G 7/02 |
| JP | 2013-208986 A | | 10/2013 | |
| JP | 2013208986 A | * | 10/2013 | ............... B62D 7/18 |

OTHER PUBLICATIONS

Notification of Reasons for Refusal Japanese Patent Application No. 2014-196790 dated Mar. 1, 2016 with English translation.

\* cited by examiner

COUPLING STRUCTURE FOR VEHICLE CHASSIS MEMBERS

CROSS-REFERENCE TO RELATED APPLICATIONS

The present invention contains subject matter related to Japanese Patent Application No. 2014-196790 filed on Sep. 26, 2014, the entire contents of which are incorporated herein by reference.

BACKGROUND

1. Technical Field

The present invention relates to a coupling structure for chassis members of a vehicle such as an automobile.

2. Related Art

In an automobile, for example, an axle housing that supports an axle of a tire and a cross member or a frame of a vehicle body are coupled to each other by link members or arm members. Also, a shock absorbing member such as a suspension is disposed between the vehicle body and the axle housing, the link members, or the arm members.

Thus, the chassis members such as the tire and the axle housing are supported such that the tire and the axle housing are movable relative to the vehicle body.

The tire and the chassis members are moved by forces in various directions input to the tire due to steering and variation of road surfaces. As a result, the vehicle body is stabilized.

In order to couple, for example, the axle housing and the chassis member such as the link member to one another, a ball joint member is used (Japanese Unexamined Patent Application Publications No. H06-115331 and No. 2013-208986).

The ball joint member typically includes a ball, a stud, and a socket. The ball has a substantially spherical shape. The stud has a columnar external shape and stands erect on the ball so as to be coupled. The socket has a columnar external shape and has a substantially spherical hole into which the ball is fitted. Grooves engageable with pinch bolts are formed throughout circumferences in outer circumferential surfaces of the socket and the stud, which have the respective columnar external shapes. The ball joint member is coupled with the other chassis member by inserting the stud or the socket, which have the respective columnar external shapes, into a coupling hole of the other chassis member and by bringing the groove into engagement with the pinch bolt attached to the other chassis member.

By coupling, for example, the axle housing to the link member by using such a ball joint member, the likelihood of stress being produced between the axle housing and the link member can be reduced when the axle housing is moved in various directions by input of an external force.

Such a ball joint member is also one type of the chassis members.

SUMMARY OF THE INVENTION

There exists a need for reduction of the weight of the vehicle body of the vehicle such as an automobile. Thus, it is conceivable to use, for example, a light metal material such as aluminum to form the chassis members including the axle housing which are, for example, cast from a heavy metal material such as iron in the related art.

However, when the chassis members including the axle housing are formed of a light metal material, which is softer than a heavy metal material, there is a concern about the strength of these members used as the chassis members. That is, large forces may be momentarily input to the vehicle chassis members of a vehicle in various directions. In the case where, for example, the socket of the ball joint member formed of a material such as iron is inserted into the coupling hole of a soft axle housing formed of light metal so as to couple the ball joint member to the axle housing, local deformation may occur in the coupling hole of the axle housing formed of light metal due to input from the ball joint member to the axle housing. This may affect steering sensation and ride quality.

It is desirable to improve the coupling structure for chassis members of a vehicle such as an automobile.

A coupling structure for vehicle chassis members according to an aspect of the present invention couples a first chassis member and a second chassis member used for a vehicle to each other. The structure includes a coupling part and a collar. The coupling part has a substantially columnar external shape, is provided in the first chassis member, and has a bolt groove throughout a circumference in an outer circumferential surface of the coupling part having the substantially columnar external shape. The collar is formed separately from the first chassis member and the second chassis member, has a substantially cylindrical shape, and is disposed so as to surround an outer circumferential surface of the coupling part having the substantially columnar external shape. The second chassis member has a coupling hole having a substantially columnar internal shape into which the coupling part is inserted. The first chassis member and the second chassis member are coupled to each other by disposing the coupling part in the coupling hole having the substantially columnar internal shape while the coupling part is surrounded by the substantially cylindrical collar.

The second chassis member may have a bolt hole for a pinch bolt that extends so as to intersect the coupling hole and that communicates with the coupling hole and a member slit that is provided so that the bolt hole is divided and the coupling hole is provided with a slit, and the substantially cylindrical collar may have a bolt relief hole. The pinch bolt inserted into the bolt hole may project into an inside of the collar through a communication hole where the bolt hole and the coupling hole communicate with each other and the bolt relief hole so as to be brought into engagement with the bolt groove of the coupling part which has been inserted into the coupling hole together with the collar.

The substantially cylindrical collar may have a collar slit formed by cutting in an axial direction of a cylindrical surface of the substantially cylindrical shape. The collar slit may intersect the bolt relief hole in the cylindrical surface of the collar.

An external shape of the substantially cylindrical collar may be larger than the coupling hole before the collar is inserted into the coupling hole.

The second chassis member may have a fastening relief hole behind the coupling hole. A diameter of the fastening relief hole may be smaller than a diameter of the coupling hole, thereby forming a step at a boundary between the coupling hole and the fastening relief hole so as to retain the collar.

The collar may be formed of a material that is more distortion resistant than a material of part of the second chassis member where the coupling hole is formed.

The collar may be formed of a metal material of a type identical to a type of a material of the coupling part of the first chassis member. A galvanic corrosion resistant treatment may be performed on an outer circumferential surface of the collar that is brought into contact with the second chassis member.

DETAILED DESCRIPTION

An implementation of the present invention will be described below with reference to the drawings.

Figure 1:
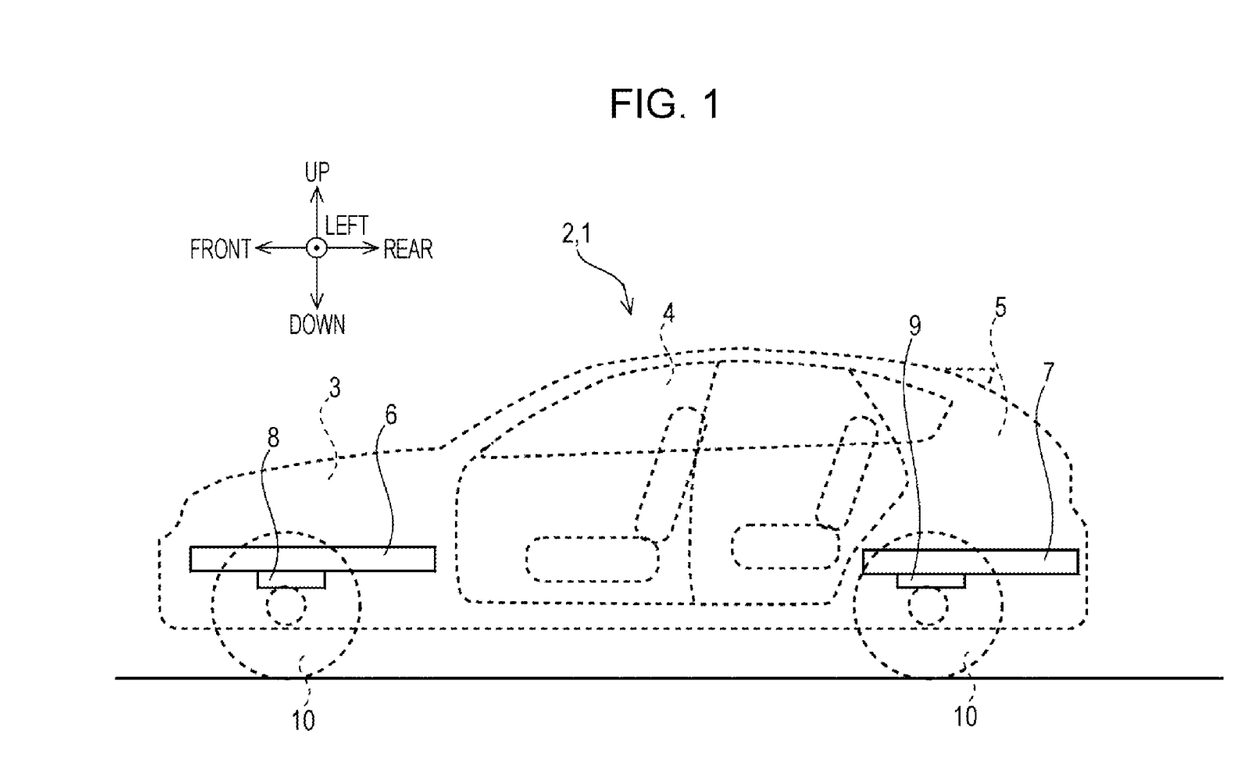
FIG. 1 illustrates an example of an automobile according to an implementation of the present invention.

FIG. 1 illustrates an example of an automobile 1 according to an implementation of the present invention. In FIG. 1, the automobile 1, which serves as an example of a vehicle, is seen from the left side.

A vehicle body 2 of the automobile 1 includes a pair of front side members 6 and a pair of rear side members 7. The front side members 6 project forward from a toe board disposed between a front room 3 and a cabin 4. The rear side members 7 project rearward from a partition disposed between the cabin 4 and a trunk room 5. Driving components such as an engine, a battery, and a motor are attached, for example, on the pair of front side members 6.

A front cross member 8 spans between the pair of front side members 6. A pair of tires 10 on the front side are disposed on the left and right of the front cross member 8. The tires 10 are supported at the vehicle body 2 by chassis structures, which will be described later, and attached such that the tires 10 are movable in the up-down, transverse, and longitudinal directions relative to the front cross member 8.

A rear cross member 9 spans between the pair of rear side members 7. A pair of tires 10 on the rear side are disposed on the left and right of the rear cross member 9. The tires 10 are supported at the vehicle body 2 by the chassis structures, which will be described later, and attached such that the tires 10 are movable in the up-down, transverse, and longitudinal directions relative to the rear cross member 9.

As described above, the tires, that is, both the pairs of the tires 10 are attached so as to be movable relative to the vehicle body 2. The tires 10 are moved in the up-down, transverse, and longitudinal directions when the automobile 1 is steered or in response to input from a road surface. The vehicle body 2 is stabilized.

Figure 2A:
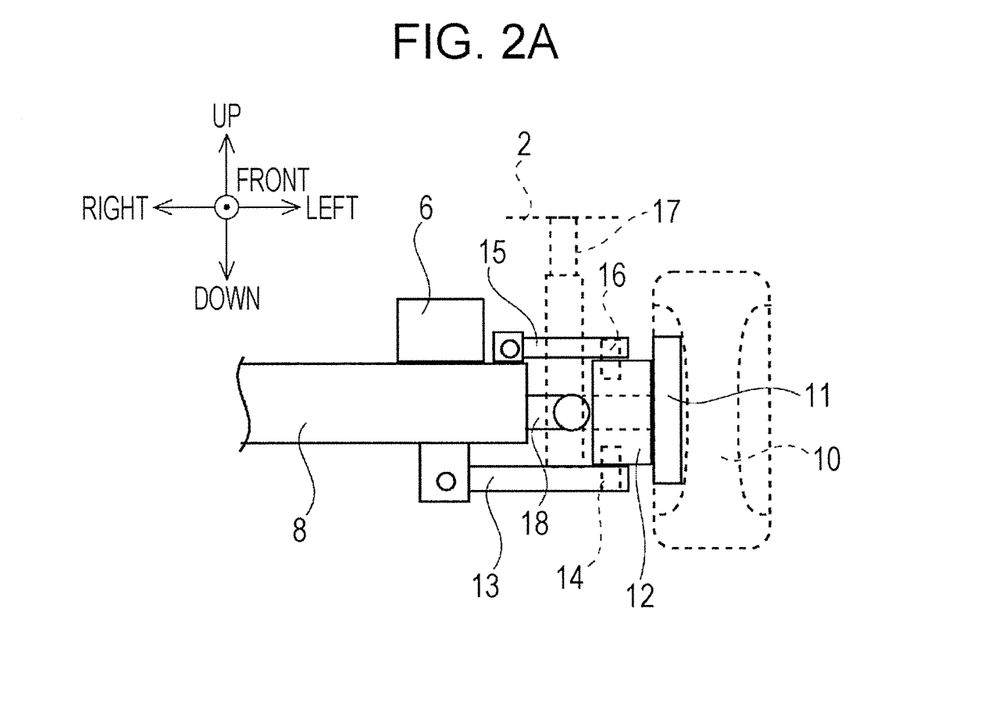
FIGS. 2A and 2B illustrate a chassis structure on the left front side of the automobile illustrated in FIG. 1.
Figure 2B:
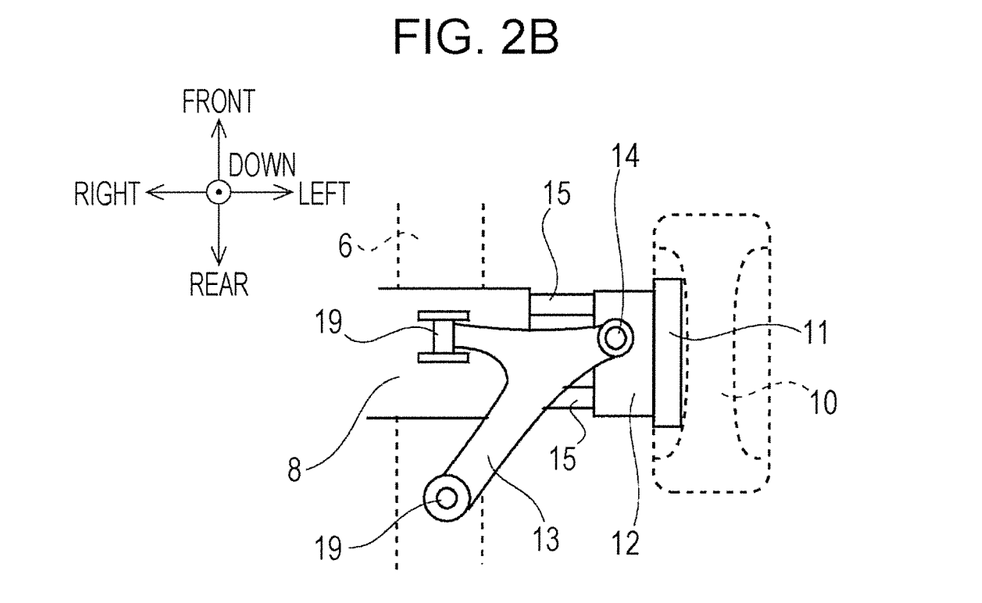

FIGS. 2A and 2B illustrate one of the chassis structures on the left front side of the automobile 1 illustrated in FIG. 1. FIG. 2A illustrates the chassis structure seen from the front. FIG. 2B illustrates the chassis structure seen from below.

The left front tire 10 of the automobile 1 is movably supported by the chassis structure illustrated in FIGS. 2A and 2B. The other tires of the automobile 1, that is, the right front tire 10, the left rear tire 10, and the right rear tire 10 are also movably supported by the similar chassis structures.

FIGS. 2A and 2B illustrate chassis members included in the chassis structure as follows: that is, a hub carrier 11, an axle housing 12, a lower arm 13, a lower ball joint member 14, a plurality of trailing links 15, a plurality of upper ball joint members 16, and a suspension device 17. Other than these, the chassis members that can be movably attached to the vehicle body 2 include, for example, a knuckle arm that transmits operation of a steering wheel.

A wheel of the tire 10 is attached to the hub carrier 11. The hub carrier 11 is attached to the tip of an axle shaft 18 that projects outward from the front side member 6. The hub carrier 11 is rotated together with the axle shaft 18. The axle shaft 18 includes a mechanical joint that allows the axle shaft 18 to be bent. Thus, the axle shaft 18 and the hub carrier 11 can follow the movement of the axle housing 12 in the up-down, transverse, and longitudinal directions.

The axle housing 12 supports the hub carrier 11 and the axle shaft 18 such that the hub carrier 11 and the axle shaft 18 are rotatable relative to the axle shaft 18. The axle shaft 18 is inserted through a through hole that penetrates through a central portion of the axle housing 12. The hub carrier 11 is disposed on the left side of the axle housing 12 in the transverse diction.

The lower arm 13 and the plurality of trailing links 15 are included in a socket 24 member. The axle housing 12 is movably supported relative to the vehicle body 2 by the socket 24 in the up-down, transverse, and longitudinal directions.

The lower arm 13 is typically formed of a highly stiff heavy metal material such as iron and has a substantially Y-shape. Rubber bushes 19 are attached to two tips of the substantially Y-shape. The two tips are attached to a lower surface of the front cross member 8 with the two rubber bushes 19 interposed therebetween. The other one tip is disposed on the lower side of the axle housing 12. The lower arm 13 and the axle housing 12 are coupled to each other by the lower ball joint member 14.

The trailing links 15 are typically formed of a highly stiff heavy metal material such as iron and each have a substantially I-shape. One end of each of the substantially I-shaped trailing links 15 is rotatably attached to an upper surface of the front cross member 8. The other end of the trailing link 15 is disposed on the upper side of the axle housing 12. The trailing links 15 are each coupled to the axle housing 12 by a corresponding one of the upper ball joint members 16.

As described above, the axle housing 12 is coupled to the other chassis members by using ball joint members 21 such as the lower ball joint member 14 and the upper ball joint members 16. This allows the axle housing 12 to be maintained in a standing position when the axle housing 12 is moved in the up-down, transverse, and longitudinal directions.

The suspension device 17 suppresses and absorbs the movement of the axle housing 12 and the tire 10 in the up-down, transverse, and longitudinal directions. Here, the suspension device 17 is attached between the lower arm 13 and a metal sheet of the vehicle body 2.

Figure 3A:
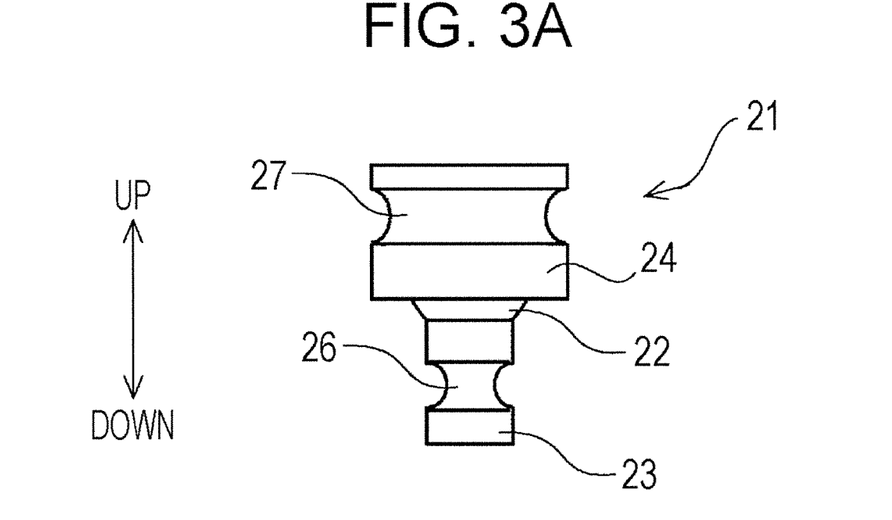
FIGS. 3A and 3B illustrate a view and a partially cross-sectional view, respectively, of an example of a typical ball joint member used for the chassis structure illustrated in FIGS. 2A and 2B.
Figure 3B:
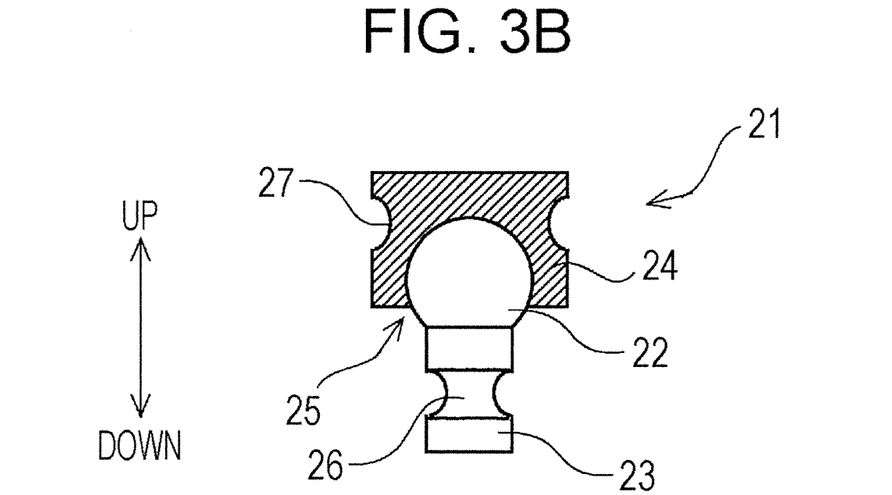

FIGS. 3A and 3B illustrate an example of one of the typical ball joint members 21 used for the chassis structure illustrated in FIGS. 2A and 2B. FIG. 3A is a side view of the ball joint member 21. FIG. 3B is a sectional view of part of the ball joint member 21.

The ball joint member 21 illustrated in FIGS. 3A and 3B includes a ball 22, a stud 23, and the socket 24.

The ball 22 is formed of, for example, a heavy metal material such as iron and has a substantially spherical shape.

The stud 23 is formed of, for example, a heavy metal material such as iron and has a substantially columnar shape. The stud 23 is integrated with the substantially spherical ball 22 by welding or the like such that the stud 23 stands erect on the ball 22.

The socket 24 is formed of, for example, a heavy metal material such as iron and has a substantially columnar external shape. A ball hole 25 is formed in the substantially columnar socket 24. The ball 22 is received in the ball hole 25. The ball hole 25 is open at a bottom surface of the socket 24 having the substantially columnar external shape.

The ball 22 is received in the ball hole 25 of the socket 24. Part of the ball 22 projects from the opening of the bottom surface of the socket 24. The stud 23 stands erect on the projecting part of the ball 22. The stud 23 can be inclined relative to the socket 24 by rotating the ball 22 in the ball hole 25 of the socket 24. In order to allow the ball 22 to be smoothly moved in the socket 24, it is preferable that no strong external force be applied to the socket 24 and the stud 23 when the ball joint member 21 is coupled to another member. When, for example, the ball hole 25 of the socket 24 is deformed by an external force, the ball 22 is unlikely to be smoothly moved in the ball hole 25.

Thus, the ball joint member 21 typically has a stud bolt groove 26 in an outer circumferential surface of the stud 23 having a substantially columnar external shape. The stud bolt groove 26 is engageable with one of pinch bolts 41. The stud bolt groove 26 is formed throughout the circumference along the outer circumferential surface of the substantially columnar stud 23.

Also, a socket bolt groove 27 is formed in an outer circumferential surface of the substantially columnar socket 24. The socket bolt groove 27 is engageable with another pinch bolt 41. The socket bolt groove 27 is formed throughout the circumference along the outer circumferential surface of the substantially columnar socket 24.

In order to couple the ball joint member 21 with another component, the stud 23 or the socket 24 is inserted into the other component, and still another pinch bolt 41 attached to the other component is brought into engagement with the stud bolt groove 26 or the socket bolt groove 27. Thus, the ball joint member 21 is coupled to the other component. Furthermore, by attaching the ball joint member 21 in such a method, neither of the stud 23 and the socket 24 of the ball joint member 21 is directly fastened. Accordingly, the stud 23 or the socket 24 is unlikely to be deformed by the external force in the ball joint member 21 having been attached to the other component. As a result, even after the ball joint member 21 has been attached to the other component, the sphericity of the ball hole 25 of the socket 24 is ensured. This allows the ball 22 to be smoothly rotated in the ball hole 25.

Figure 4A:
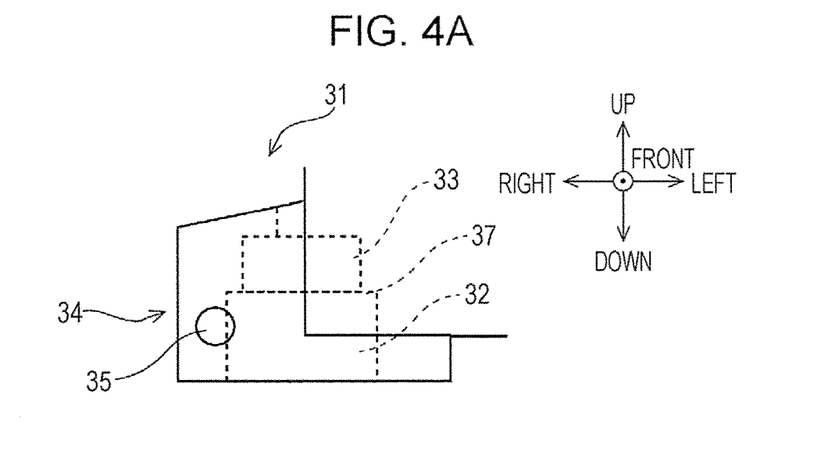
FIGS. 4A to 4C are enlarged views of a coupling section where an axle housing illustrated in FIGS. 2A and 2B is coupled to the ball joint member.
Figure 4B:
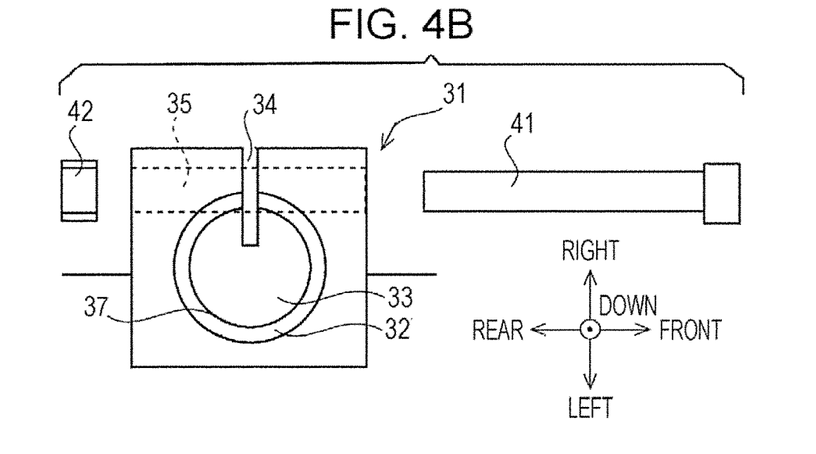
Figure 4C:
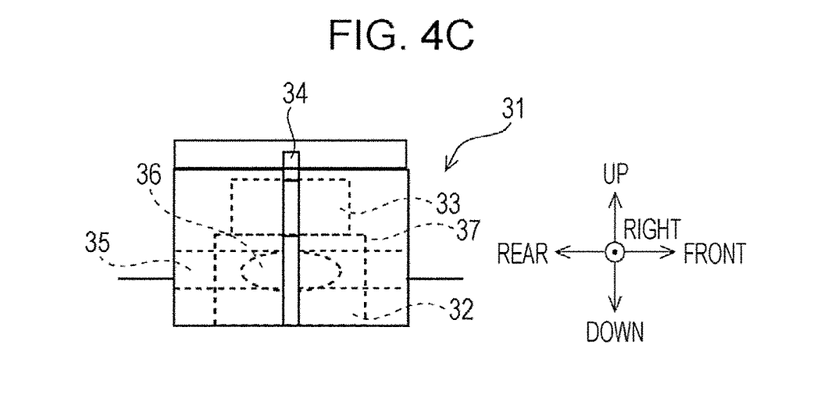

FIGS. 4A to 4C are enlarged views of a coupling section 31 where the axle housing 12 illustrated in FIGS. 2A and 2B is coupled to the ball joint member 21. FIG. 4A illustrates the coupling section 31 seen from the front. FIG. 4B illustrates the coupling section 31 seen from below. FIG. 4C illustrates the coupling section 31 seen from the right.

The coupling section 31 of the axle housing 12 illustrated in FIGS. 4A to 4C is a part projecting from a main body of the axle housing 12. This projecting part has a coupling hole 32, a fastening relief hole 33, a housing slit 34, and a bolt hole 35.

The coupling hole 32 allows the socket 24 or the stud 23 of the ball joint member 21 to be inserted thereinto. Here, the socket 24 of the ball joint member 21 is inserted into the coupling hole 32. The coupling hole 32 has a substantially columnar shape and is slightly larger than the socket 24 having the substantially columnar external shape. The coupling hole 32 is open at the bottom surface of the axle housing 12.

The bolt hole 35 allows the other pinch bolt 41 to be inserted thereinto. The bolt hole 35 is formed at the part projecting from the main body of the axle housing 12. The bolt hole 35 extends in a substantially horizontal direction that extends substantially perpendicular to the coupling hole 32.

As illustrated in FIG. 4C, the bolt hole 35 communicates with the coupling hole 32 in the axle housing 12. Thus, a communication hole 36 is formed. The other pinch bolt 41 inserted into the bolt hole 35 partially projects into the coupling hole 32 through the communication hole 36.

The housing slit 34 divides the projecting part of the axle housing 12 into two parts in the transverse direction. The housing slit 34 divides the bolt hole 35 into two parts and divides part of the coupling hole 32 into two parts. That is, the coupling hole 32 is provided with a slit. By fastening the other pinch bolt 41 inserted into the bolt hole 35 with a nut, the projecting part of the axle housing 12 divided into two parts can be fastened.

The fastening relief hole 33 is formed on the upper side of the coupling hole 32, that is, behind the coupling hole 32 seen from the bottom surface of the axle housing 12. The fastening relief hole 33 and the coupling hole 32 form a single hole as a whole. The fastening relief hole 33 has a substantially columnar shape and is slightly smaller than the coupling hole 32. Thus, a step 37 is formed at a boundary between the fastening relief hole 33 and the coupling hole 32, which are concentric with each other.

The ball joint member 21 can be coupled to the axle housing 12, by, for example, inserting the socket 24 into the coupling hole 32 of the axle housing 12, inserting the other pinch bolt 41 into the bolt hole 35 of the axle housing 12, and by fastening the projecting part of the axle housing 12 with the other pinch bolt 41 and the nut.

There exists a need for reduction of the weight of the vehicle body of the vehicle such as an automobile 1. Thus, it is conceivable to use, for example, a light metal material such as aluminum or magnesium to form the chassis members including the axle housing 12 which are, for example, cast from a heavy metal material such as iron in the related art.

However, when the chassis members such as an axle housing 12 are formed of a light metal material, which is softer than a heavy metal material, there is a concern about the strength of these members used as the chassis members. That is, forces may be input to the chassis members of a vehicle in various directions when the vehicle is steered or as responses from the road surface. For example, large input directed from the ball joint member 21 to the axle housing 12 may cause the axle housing 12 formed of light metal to be locally deformed in the coupling hole 32. In the case where a heavy metal such as iron having a large Young's modulus and a light metal such as aluminum having a small Young's modulus are brought into contact with each other, the surface durability is insufficient and the stiffness of a contact surface is insufficient on a contact surface formed of a light metal having a small Young's modulus. As a result, steering sensation and ride quality of the automobile 1 may be affected.

In particular, in order for the ball joint member 21 to be coupled to the other member without directly fastening the socket 24 and the stud 23, the socket bolt groove 27 and the stud bolt groove 26 are formed at throughout the circumference in the typical ball joint member 21. This reduces the contact area by which the socket 24 or the stud 23 inserted into the coupling hole 32 is in contact with the chassis member such as the axle housing 12 having the coupling hole 32. As a result, the above-described external force is transmitted to the chassis member such as an axle housing 12 formed of a light metal through a small contact surface. A large force is input to the chassis member through the significantly limited contact surface in a concentrated manner. Local deformation easily occurs in the chassis members formed of a light metal.

In order to suppress the occurrences of the local deformation caused by such local input of the force, for example, the diameter of the socket 24 or the stud 23 may be increased so as to increase the contact area with the axle housing 12 formed of a light metal. However, in the case where, in order to ensure the contact area as described above, the diameter of the socket 24 or the stud 23 is increased to a size that is larger than the size required to ensure the original strength, it is also required that, for example, the size and the stiffness of the coupling section 31 of the axle housing 12 be increased. As a result, the size of the axle housing 12 is increased. This reduces the effect of reducing the weight of the vehicle by using a light metal material to form the axle housing 12.

Thus, there exists a need for improvement of a coupling structure for chassis members of a vehicle such as the automobile 1.

Figure 5A:
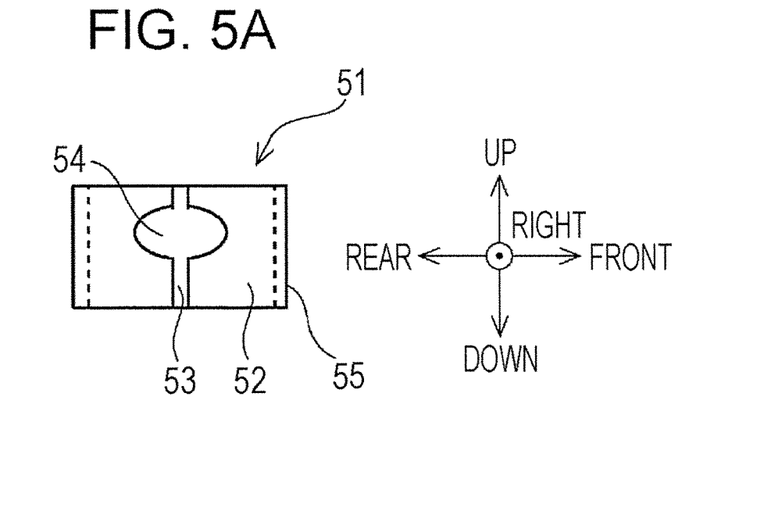
FIGS. 5A to 5C illustrate a collar used for the chassis structure illustrated in FIGS. 2A and 2B.
Figure 5B:
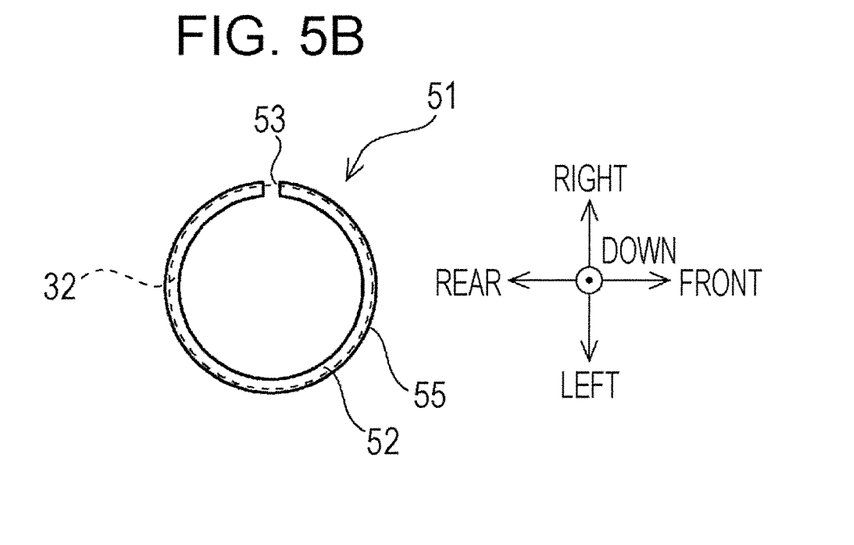
Figure 5C:
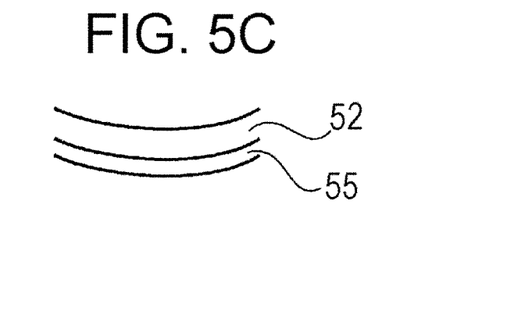

FIGS. 5A to 5C illustrate a collar 51 used for the chassis structure illustrated in FIGS. 2A and 2B. FIG. 5A is a side view of the collar 51. FIG. 5B is a bottom view of the collar 51. FIG. 5C is an enlarged view of part of outer circumference of the collar 51.

The collar 51 illustrated in FIGS. 5A to 5C has a collar main body 52, a collar slit 53, a bolt relief hole 54, and a galvanic corrosion resistant layer 55. The collar 51 is formed separately from the axle housing 12 and the ball joint member 21.

In the case where the axle housing 12 is formed of, for example, a light metal material such as aluminum, the collar main body 52 may be formed of, for example, a heavy metal material such as iron having a larger Young's modulus than that of a light metal material. Here, the collar 51 is formed of iron which is a metal of the same type as that used to form the socket 24 or the stud 23 of the ball joint member 21. This reduces the likelihood of the collar 51 being distorted compared to the coupling section 31 of the axle housing 12.

The collar main body 52 has a substantially cylindrical shape. It is sufficient that the collar main body 52 have an inner diameter that allows the socket 24 of the ball joint member 21 to be inserted thereinto. Also, it is sufficient that the collar main body 52 have an external shape that allows the collar main body 52 to be inserted into the coupling hole 32 of the axle housing 12. Here, as illustrated in FIG. 5B, the collar main body 52 in a state before the collar main body 52 is inserted into the coupling hole 32 has a diameter slightly larger than that of the coupling hole 32 of the axle housing 12.

A cylindrical surface of the substantially cylindrical collar main body 52 is cut vertically in FIG. 5A in the axial direction of the cylinder to form the collar slit 53. This allows the collar main body 52 having a diameter slightly larger than that of the coupling hole 32 of the axle housing 12 to be bent so that the collar main body 52 so as to be compressed. Thus, the collar main body 52 can be inserted into the coupling hole 32 of the axle housing 12.

The galvanic corrosion resistant layer 55 is formed on an outer circumferential surface of the substantially cylindrical collar main body 52. The galvanic corrosion resistant layer 55 can be formed by performing, for example, a cation coating treatment or a dacrotizing treatment on, for example, the outer circumferential surface of the collar main body 52 having been formed. Thus, formation of the galvanic corrosion resistant layer 55 is not required for the large axle housing 12, the socket 24 of the ball joint member 21 as a finished product, and so forth. The galvanic corrosion resistant layer 55 can be more easily formed in a small area for the small substantially cylindrical collar main body 52.

The bolt relief hole 54 is formed in the cylindrical circumferential surface of the collar main body 52. It is sufficient that the bolt relief hole 54 have a size that is, for example, equal to the communication hole 36 of the axle housing 12. Here, as illustrated in FIG. 5A, the bolt relief hole 54 is a long hole elongated in a circumferential direction of the substantially cylindrical collar main body 52. Thus, the other pinch bolt 41 inserted into the bolt hole 35 can partially project into the collar main body 52 through the bolt relief hole 54.

The bolt relief hole 54, which is elongated in the circumferential direction of the substantially cylindrical collar main body 52, and the collar slit 53, at which the substantially cylindrical collar main body 52 is cut vertically in FIG. 5A in the axial direction, are perpendicularly intersect each other in the cylindrical surface of the collar main body 52. The substantially cylindrical collar main body 52 is cut vertically in FIG. 5A in the axial direction at the collar slit 53 in a central portion of the horizontally elongated bolt relief hole 54.

Figure 6A:
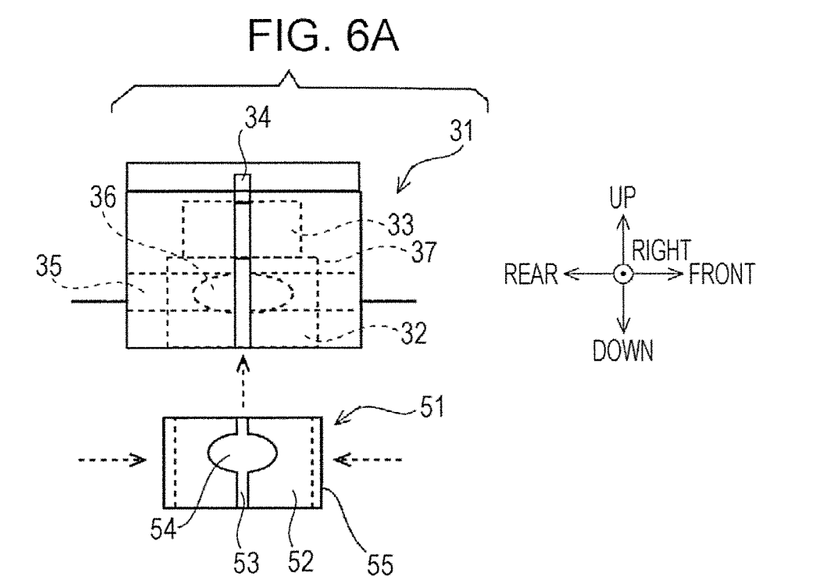
FIGS. 6A and 6B illustrate a method of coupling the ball joint member and the axle housing illustrated in FIGS. 2A and 2B with each other.
Figure 6B:
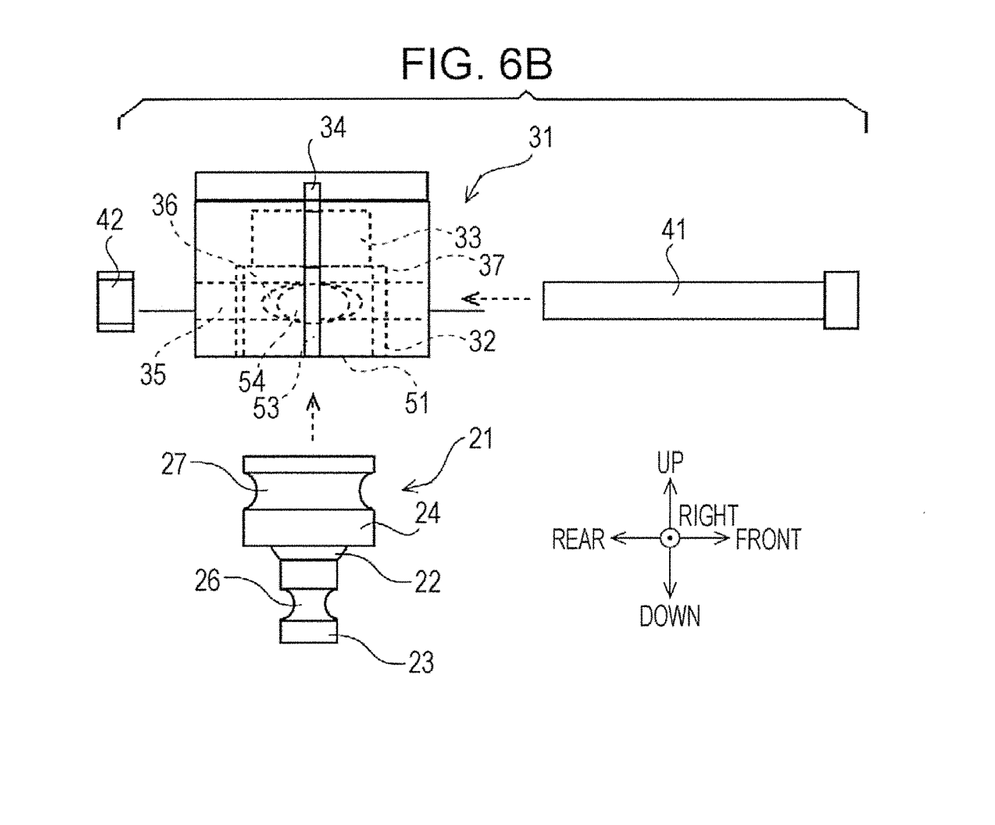

FIGS. 6A and 6B illustrate a method of coupling the ball joint member 21 and the axle housing 12 illustrated in FIGS. 2A and 2B with each other. FIG. 6A illustrates a step of attaching the collar 51 to the axle housing 12. FIG. 6B illustrates a step of attaching the ball joint member 21 to the axle housing 12.

In order to couple the axle housing 12 with the socket 24 of the ball joint member 21, as illustrated in FIG. 6A, the collar 51 is initially inserted into the coupling hole 32 of the axle housing 12. The collar 51 in a state in which the collar 51 is bent so as to be compressed can be inserted into the coupling hole 32 of the axle housing 12. In this way, as illustrated in FIG. 6B, the collar main body 52 can be pushed into the coupling hole 32 until the collar main body 52 abuts the step 37 formed between the fastening relief hole 33 and the coupling hole 32 of the axle housing 12. Furthermore, the collar main body 52 is pushed into the coupling hole 32 with the collar slit 53 and the housing slit 34 aligned with each other.

Furthermore, the collar 51 is attached to the coupling hole 32 of the axle housing 12 with the collar main body 52 received in the coupling hole 32. The bolt relief hole 54 of the collar 51 is aligned with the communication hole 36 of the axle housing 12. By aligning the collar slit 53 with the housing slit 34 at the bottom surface of the axle housing 12, the bolt relief hole 54 of the collar 51 can be aligned with the communication hole 36 of the axle housing 12. Thus, the collar 51 can be easily positioned.

Furthermore, the collar 51, which is inserted into the coupling hole 32 by interference fit, is unlikely to drop from the coupling hole 32. The collar 51 can be temporarily secured to the communication hole 36 of the axle housing 12 by applying a small load.

Furthermore, the galvanic corrosion resistant layer 55 is provided between the collar main body 52 formed of iron and the axle housing 12 formed of light metal. Thus, galvanic corrosion is unlikely to occur in the coupling section 31 where the axle housing 12 is coupled to the ball joint member 21.

Next, as illustrated in FIG. 6B, the socket 24 of the ball joint member 21 is inserted into the coupling hole 32 to which the collar 51 is temporarily secured. The socket 24 can be pushed into the coupling hole 32 until the socket 24 abuts the step 37 formed between the fastening relief hole 33 and the coupling hole 32 of the axle housing 12.

Thus, the socket bolt groove 27 formed in the outer circumferential surface of the socket 24 having the substantially columnar external shape is aligned with the bolt relief hole 54 of the collar 51 and the communication hole 36 of the axle housing 12.

Next, as illustrated in FIG. 6B, the other pinch bolt 41 is inserted into the bolt hole 35 of the axle housing 12 and fastened with a nut 42. Thus, the projecting part of the axle housing 12 divided into the two parts by the housing slit 34 is fastened. With the fastening relief hole 33, the diameter of the coupling hole 32 of the axle housing 12 is entirely reduced. An outer circumferential surface of the collar 51 can be brought into intimate contact with a cylindrical inner surface of the axle housing 12 that defines the coupling hole 32, and the outer circumferential surface of the socket 24 of the ball joint member 21 can be brought into intimate contact with a cylindrical inner surface of the collar 51. The substantially cylindrical collar 51 is disposed so as to surround the outer circumferential surface of the socket 24.

Furthermore, with the nut 42, the other pinch bolt 41 is secured in a state in which the other pinch bolt 41 is inserted into the bolt hole 35. Part of the other pinch bolt 41 secured to the axle housing 12 projects into the coupling hole 32 through the communication hole 36 of the axle housing 12 and the bolt relief hole 54 of the collar 51. The projecting part of the other pinch bolt 41 is brought into engagement with the socket bolt groove 27 formed in the outer circumferential surface of the socket 24 of the ball joint member 21.

Thus, the socket 24 of the ball joint member 21 can be prevented from dropping from the coupling hole 32 of the axle housing 12 without fastening the socket 24 of the ball joint member 21.

Figure 7:
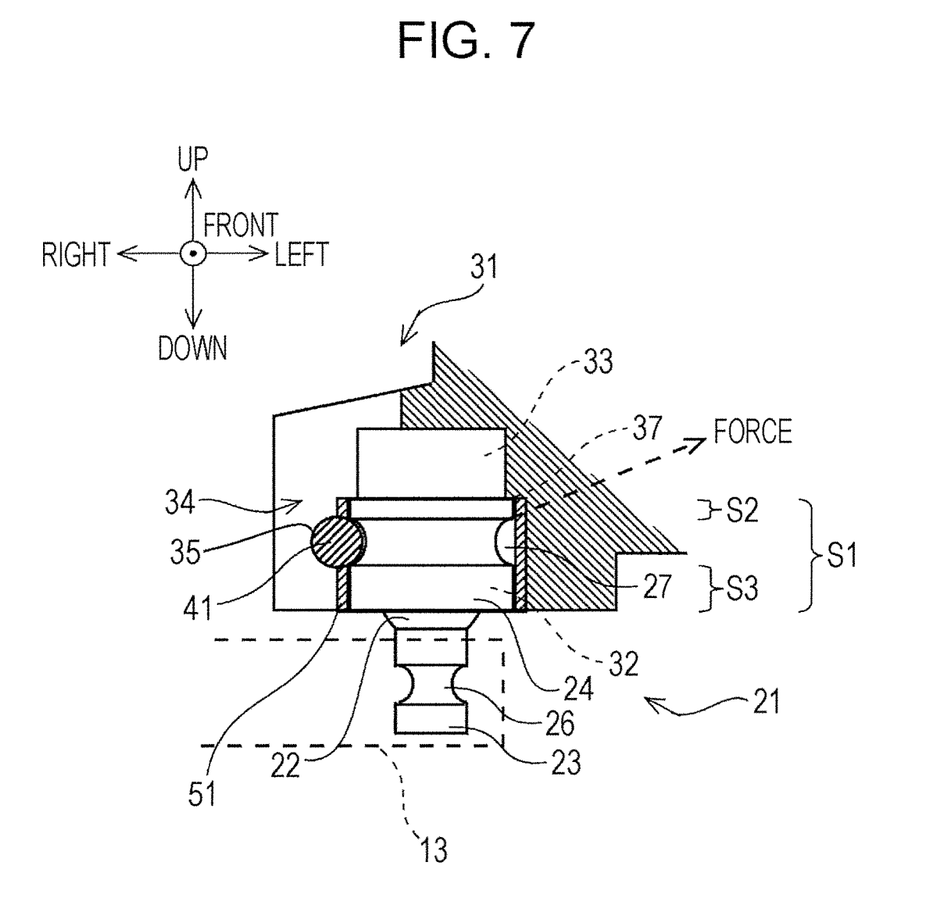
FIG. 7 illustrates a coupling state in which the ball joint member and the axle housing illustrated in FIGS. 2A and 2B are coupled to each other.

FIG. 7 illustrates a coupling state in which the ball joint member 21 and the axle housing 12 illustrated in FIGS. 2A and 2B are coupled to each other. FIG. 7 also illustrates the lower arm 13 connected with the stud 23 of the ball joint member 21.

As illustrated in FIG. 7, the lower arm 13 and the axle housing 12 are coupled to each other by the ball joint member 21. Particularly, the axle housing 12 is coupled to the socket 24 of the ball joint member 21 by bringing the socket 24 of the ball joint member 21 inserted into the coupling hole 32 of the axle housing 12 into engagement with the other pinch bolt 41. Furthermore, the lower arm 13 is coupled to the stud 23 of the ball joint member 21 by bringing the stud 23 of the ball joint member 21 inserted into the coupling hole 32 of the lower arm 13 into engagement with the one pinch bolt 41.

Also in FIG. 7, the substantially cylindrical collar main body 52 is disposed in the coupling hole 32 of the axle housing 12 so as to be aligned with the socket 24 of the ball joint member 21. The entirety of the cylindrical outer circumferential surface of the substantially cylindrical collar main body 52 can be brought into contact with the cylindrical inner surface of the axle housing 12 that defines the coupling hole 32. In this case, the contact area of the axle housing 12 is the entirety of an outer circumferential surface S1 of the collar main body 52. The area of the outer circumferential surface S1 of the collar main body 52 is substantially the same as that of the entirety of the outer circumferential surface of the socket 24.

In contrast, if the socket 24 of the ball joint member 21 is directly inserted into the coupling hole 32 of the axle housing 12 without, for example, the collar 51, the contact area of the axle housing 12 is the sum of the areas of S2 and S3, which are portions of the outer circumferential surface of the socket 24 where the socket bolt groove 27 is not formed.

In the coupling state illustrated in FIG. 7, it is assumed that a force directed from the ball joint member 21 in a direction, for example, from the lower left to the upper light as indicated by a dotted arrow in FIG. 7 acts on the coupling section 31 of the axle housing 12.

In this case, S2 and S3, the sum of the areas of which is reduced by forming of the socket bolt groove 27, of the socket 24 formed of heavy metal are pressed against an inner peripheral surface of the collar main body 52.

The collar main body 52 is formed of a heavy metal material of the same type as that of the socket 24 and has high stiffness. The collar main body 52 is unlikely to be deformed by a force locally input from the socket 24 formed of heavy metal.

As a result, the collar 51 is pressed against the cylindrical inner surface of the axle housing 12 that defines the coupling hole 32 by the large area of S1 of the outer circumferential surface of the collar main body 52.

Thus, the force transmitted from the ball joint member 21 to the collar main body 52 is distributed in the collar main body 52, and the distributed force acts on the cylindrical inner surface of the axle housing 12 that defines the coupling hole 32. This reduces the likelihood of a large force locally acting on the cylindrical inner surface of the axle housing 12. Accordingly, the likelihood of the axle housing 12 being locally significantly deformed is reduced.

As described above, according to the present implementation, in a state in which the ball joint member 21 and the axle housing 12 used for the automobile 1 are coupled to each other, the socket 24, which has the substantially columnar external shape, of the ball joint member 21 is surrounded by the substantially cylindrical collar 51. The socket 24 surrounded by the collar 51 together with the collar 51 is disposed in the coupling hole 32, which has a substantially columnar internal shape, of the axle housing 12 used for the automobile 1. The substantially cylindrical collar 51 can be entirely brought into contact with the axle housing 12 at the coupling hole 32 having the substantially columnar internal shape.

In contrast, for example, if the socket 24, which has the substantially columnar external shape, of the ball joint member 21 is directly inserted into the coupling hole 32, which has the substantially columnar internal shape, of the axle housing 12, the contact area by which the axle housing 12 is brought into contact with the socket 24 is reduced due to the formation of the socket bolt groove 27 throughout the circumference of the socket 24, which has the substantially columnar external shape, of the ball joint member 21.

Thus, according to the present implementation, compared to the case where the socket 24, which has the substantially columnar external shape, of the ball joint member 21 is directly inserted into the coupling hole 32, which has the substantially columnar internal shape, of the axle housing 12, the area by which the axle housing 12 is brought into contact with the other member (here, the collar 51) can be increased.

Since the contact area of the axle housing 12 is increased, even when, for example, a force directed from the ball joint member 21 to the axle housing 12 acts on the axle housing 12 while the automobile 1 is traveling, a region of the axle housing 12 on which the force acts is increased to a surface region in contact with the substantially cylindrical collar 51. The force acting on the axle housing 12 is distributed. This can effectively suppress a situation in which the force locally acts on the axle housing 12, and consequently, the local part is deformed.

In contrast, if, for example, the socket 24 is directly inserted into the coupling hole 32, the outer circumferential surface of the socket 24 is separated by the socket bolt groove 27. The contact area by which the axle housing 12 is brought into contact with the other member (here, the socket 24) is reduced compared to the case where the socket bolt groove 27 is not formed. In this case, the force is locally input to the axle housing 12 through the small contact area. Thus, there is a concern about deformation of the local part of the axle housing 12 caused by the locally input strong force. In order to reduce such concentration of the force, for example, the diameter of the socket 24 may be increased. In this case, however, it is required that the size of the axle housing 12 in which the coupling hole 32 is formed be also increased due to the increase in the size of the socket 24. The increase in the size of the axle housing 12 leads to an increase in the weight of the chassis members of the automobile 1.

According to the present implementation, the bolt hole 35 for a pinch bolt and the coupling hole 32 communicate with each other in the axle housing 12. Furthermore, the communication hole 36 where the bolt hole 35 and the coupling hole 32 communicate with each other is aligned with the bolt relief hole 54 of the collar 51. When the other pinch bolt 41 is inserted into the bolt hole 35 of the axle housing 12, part of the other pinch bolt 41 can project into the inside of the collar 51. This brings part of the other pinch bolt 41 into engagement with the socket bolt groove 27 of the socket 24, which together with the collar 51 is disposed in the coupling hole 32. This engagement reduces the likelihood of the socket 24 of the ball joint member 21 inserted into the coupling hole 32 dropping from the coupling hole 32.

Thus, by inserting the other pinch bolt 41 into the bolt hole 35 of the axle housing 12 and fastening the other pinch bolt 41, the ball joint member 21 and the axle housing 12 can be coupled to each other. Although the substantially cylindrical collar 51 is additionally disposed between the ball joint member 21 and the axle housing 12, efficiency of an operation of coupling the ball joint member 21 and the axle housing 12 to each other is not degraded.

According to the present implementation, the substantially cylindrical collar 51 has the collar slit 53 at which the cylindrical surface of the substantially cylindrical collar main body 52 is cut in the axial direction.

Thus, by inserting the socket 24 into the substantially cylindrical collar main body 52 in a state in which the collar main body 52 is extended so as to be larger than the socket 24, the socket 24 can be easily surrounded by the substantially cylindrical collar 51.

In addition, for example, by setting the diameter of the external shape of the substantially cylindrical collar 51 to be slightly larger than the diameter of the coupling hole 32 of the axle housing 12, the collar 51 can be temporarily secured to the coupling hole 32 before the socket 24 of the ball joint member 21 is inserted into the coupling hole 32. As a result, the axle housing 12 can be attached to the coupling hole 32 to which the collar 51 has been attached.

Furthermore, the collar slit 53 intersects the bolt relief hole 54 in the cylindrical surface of the substantially cylindrical collar main body 52. Thus, for example, by adjusting the orientation of the collar 51 so that the collar slit 53 of the collar 51 is aligned with the housing slit 34 of the axle housing 12, the bolt relief hole 54 of the collar 51 can be aligned with the part of the axle housing 12 where the bolt hole 35 and the coupling hole 32 communicate with each other (communication hole 36). The collar 51 can be positioned relative to the axle housing 12 by positioning the collar slit 53 and the housing slit 34 with respect to each other, the positioning of the collar slit 53 and the housing slit 34 being easily visually checked from the outside. The bolt relief hole 54 of the collar 51 can be easily aligned with the part where the bolt hole 35 and the coupling hole 32 communicate with each other.

According to the present implementation, the fastening relief hole 33 is formed behind the coupling hole 32 of the axle housing 12. Thus, the coupling hole 32 can be entirely fastened by fastening the other pinch bolt 41. A situation in which fastening of only a part where the housing slit 34 is formed can be avoided. As a result, the ball joint member 21 fastened by the other pinch bolt 41 can fasten the entirety of the outer circumferences of the collar 51 and the socket 24 in the coupling hole 32. Furthermore, in addition to fastening of an opening of the coupling hole 32, a part of the coupling hole 32 behind the opening can be fastened together with the opening. Entirely fastening the coupling hole 32 can bring the entire circumference of the collar 51 into contact with the housing slit 34.

Furthermore, the diameter of the fastening relief hole 33 formed behind the coupling hole 32 is reduced compared to that of the coupling hole 32, thereby forming the step 37 so as to retain the collar at the boundary between the fastening relief hole 33 and the coupling hole 32. By inserting the collar 51 into the coupling hole 32 until the collar 51 abuts this step 37, the bolt relief hole 54 of the collar 51 can be easily aligned with the part where the bolt hole 35 and the coupling hole 32 of the axle housing 12 communicate with each other. The collar 51 inserted into an insertion hole can be easily positioned in the outer circumferential direction and the axial direction.

According to the present implementation, the collar main body 52 is formed of a material that is more distortion coupling than that of part of the axle housing 12 where the coupling hole 32 is formed. Particularly, the axle housing 12 is formed of a light metal material such as aluminum, and the collar main body 52 is formed of iron, which is a heavy metal material and has a larger Young's modulus than that of a light metal material.

Thus, a force acting on the axle housing 12 through the ball joint member 21 is distributed by the collar main body 52 formed of a distortion resistant material before the force acts on the axle housing 12. The distributed force acts on the axle housing 12, and concentration of stress is unlikely to occur.

According to the present implementation, the collar main body 52 is formed of a metal material of the same type as that used to form the socket 24 of the ball joint members 21, that is, iron, and a galvanic corrosion resistant treatment is performed on the outer circumferential surface of the collar main body 52.

Thus, galvanic action is unlikely to occur between the collar main body 52 and the socket 24 of the ball joint member 21 and between the collar main body 52 and the axle housing 12. Here, although the axle housing 12 is formed of light metal such as aluminum, and the socket 24 of the ball joint member 21 and the collar 51 are formed of a heavy metal material such as iron, galvanic action is unlikely to occur between the axle housing 12 and the collar 51.

The above-described implementation is an example of a preferred implementation of the present invention. However, the implementation of the present invention is not limited to this. Various variants or modifications are possible without departing from the gist of the implementation of the present invention.

For example, the above-described implementation is an example in which the implementation of the present invention is applied to coupling of the axle housing 12 with the socket 24 of the ball joint member 21 in the case where the axle housing 12 and the lower arm 13 are coupling to each other.

Other than this, the implementation of the present invention is applicable to the case where the stud 23 of the ball joint member 21 is coupled to the axle housing 12. In this case, the collar 51 is disposed so as to surround the stud 23 having the stud bolt groove 26.

Furthermore, the implementation of the present invention is also applicable to the case where, for example, the ball joint member 21 is coupled to the lower arm 13 or any one of the trailing links 15. Also, the implementation of the present invention is applicable to the case where the ball joint member 21 is coupled to the knuckle arm that transmits operation of a steering wheel and the axle housing 12 in the case where the knuckle arm and the axle housing 12 are coupled to each other.

Furthermore, the ball joint member 21 may be integrated with one of two chassis members that are coupled to each other by the ball joint member 21. Also in this case, the implementation of the present invention can be used when the ball joint member 21 is coupled with the other chassis member.

By using the coupling structure for chassis members according to the implementation of the present invention, for example, a chassis member coupled to the ball joint member 21 can be formed of a light metal material, and accordingly, the weight of the automobile 1 can be reduced.

The above-described implementation is an example in which the implementation of the present invention is applied to the coupling structure of the chassis members of the automobile 1.

Other than this, the implementation of the present invention is applicable to, for example, vehicles such as aircrafts, bicycles, and electric rail cars. By applying the implementation of the present invention to coupling structures for chassis members of these vehicles, the weight of the vehicles can be reduced.

The invention claimed is:

1. A structure, comprising:
a coupling part that has a substantially columnar external shape, that is provided in a first chassis member of a vehicle, and that has a bolt groove throughout a circumference in an outer circumferential surface of the coupling part having the substantially columnar external shape;
a coupling hole, in a second chassis member of the vehicle, having a substantially columnar internal shape into which the coupling part is inserted;
a bolt hole for a pinch bolt that is disposed in the second chassis member and extends so as to intersect the coupling hole and that communicates with the coupling hole;
a member slit that is disposed in the second chassis member so that the bolt hole is divided and the coupling hole is provided with a slit;
a collar that is formed separately from the first chassis member and the second chassis member, that has a substantially cylindrical shape, that is inserted into the coupling hole so that a distal end of the collar in an insertion direction is in contact with an inside of the coupling hole, and that is disposed so as to surround an outer circumferential surface of the coupling part having the substantially columnar external shape; and
a bolt relief hole that is formed in the substantially cylindrical collar,
wherein the first chassis member and the second chassis member are coupled to each other by disposing the coupling part in the coupling hole having the substantially columnar internal shape while the coupling part is surrounded by the substantially cylindrical collar and by causing the pinch bolt inserted into the bolt hole to project into an inside of the collar through a communication hole where the bolt hole and the coupling hole communicate with each other and the bolt relief hole so as to be brought into engagement with the bolt groove of the coupling part which has been inserted into the coupling hole together with the collar,
wherein the second chassis member has a through hole for supporting an axle shaft,
wherein the substantially cylindrical collar has a collar slit formed by cutting in an axial direction of a cylindrical surface of the substantially cylindrical shape, and
wherein the collar slit intersects the bolt relief hole in the cylindrical surface of the collar.

2. The structure according to claim 1,
wherein the second chassis member has a fastening relief hole behind the coupling hole, and
a diameter of the fastening relief hole is smaller than a diameter of the coupling hole, thereby forming a step at a boundary between the coupling hole and the fastening relief hole so as to retain the collar.

3. The structure according to claim 2,
wherein the collar is formed of a material that is more distortion resistant than a material of part of the second chassis member where the coupling hole is formed.

4. The structure according to claim 2,
wherein the collar is formed of a metal material of a type identical to a type of a material of the coupling part of the first chassis member, and
wherein a galvanic corrosion resistant treatment is performed on an outer circumferential surface of the collar that is brought into contact with the second chassis member.

5. The structure according to claim 1,
wherein the collar is formed of a material that is more distortion resistant than a material of part of the second chassis member where the coupling hole is formed.

6. The structure according to claim 1,
wherein the collar is formed of a metal material of a type identical to a type of a material of the coupling part of the first chassis member, and
wherein a galvanic corrosion resistant treatment is performed on an outer circumferential surface of the collar that is brought into contact with the second chassis member.

7. The structure according to claim 1,
wherein an external shape of the substantially cylindrical collar is larger than the coupling hole before the collar is inserted into the coupling hole.

8. The structure according to claim 7,
wherein the collar is formed of a material that is more distortion resistant than a material of part of the second chassis member where the coupling hole is formed.

9. The structure according to claim 7,
wherein the collar is formed of a metal material of a type identical to a type of a material of the coupling part of the first chassis member, and
wherein a galvanic corrosion resistant treatment is performed on an outer circumferential surface of the collar that is brought into contact with the second chassis member.

10. The structure according to claim 1,
wherein the collar is formed of a material that is more distortion resistant than a material of part of the second chassis member where the coupling hole is formed.

11. The structure according to claim 1,
wherein the collar is formed of a metal material of a type identical to a type of a material of the coupling part of the first chassis member, and
wherein a galvanic corrosion resistant treatment is performed on an outer circumferential surface of the collar that is brought into contact with the second chassis member.

12. The structure according to claim 1,
wherein the bolt hole and collar are configured such that a distance of the pinch bolt in a radial direction of the collar traverses from outside the collar in the radial direction to inside the collar in the radial direction.

13. A coupling structure for vehicle chassis members that couples a first chassis member and a second chassis member used for a vehicle to each other, the structure comprising:
a coupling part that has a substantially columnar external shape, that is provided in the first chassis member, and that has a bolt groove throughout a circumference in an outer circumferential surface of the coupling part having the substantially columnar external shape;
a coupling hole, in the second chassis member, having a substantially columnar internal shape into which the coupling part is inserted;
a bolt hole for a pinch bolt that is disposed in the second chassis member and extends so as to intersect the coupling hole and that communicates with the coupling hole;
a member slit that is disposed in the second chassis member so that the bolt hole is divided and the coupling hole is provided with a slit;
a collar that is formed separately from the first chassis member and the second chassis member, that has a substantially cylindrical shape, that is inserted into the coupling hole, and that is disposed so as to surround an outer circumferential surface of the coupling part having the substantially columnar external shape; and
a bolt relief hole that is formed in the substantially cylindrical collar,
wherein the first chassis member and the second chassis member are coupled to each other by disposing the coupling part in the coupling hole having the substantially columnar internal shape while the coupling part is surrounded by the substantially cylindrical collar and by causing the pinch bolt inserted into the bolt hole to project into an inside of the collar through a communication hole where the bolt hole and the coupling hole communicate with each other and the bolt relief hole so as to be brought into engagement with the bolt groove of the coupling part which has been inserted into the coupling hole together with the collar,
wherein the substantially cylindrical collar has a collar slit formed by cutting in an axial direction of a cylindrical surface of the substantially cylindrical shape, and
wherein the collar slit intersects the bolt relief hole in the cylindrical surface of the collar.

14. The coupling structure for vehicle chassis members according to claim 13,
wherein an external shape of the substantially cylindrical collar is larger than the coupling hole before the collar is inserted into the coupling hole.

15. The coupling structure for vehicle chassis members according to claim 14,
wherein the collar is formed of a material that is more distortion resistant than a material of part of the second chassis member where the coupling hole is formed.

16. The coupling structure for vehicle chassis members according to claim 14,
wherein the collar is formed of a metal material of a type identical to a type of a material of the coupling part of the first chassis member, and
wherein a galvanic corrosion resistant treatment is performed on an outer circumferential surface of the collar that is brought into contact with the second chassis member.

17. The coupling structure for vehicle chassis members according to claim 13,
wherein the collar is formed of a material that is more distortion resistant than a material of part of the second chassis member where the coupling hole is formed.

18. The coupling structure for vehicle chassis members according to claim 13,
wherein the collar is formed of a metal material of a type identical to a type of a material of the coupling part of the first chassis member, and
wherein a galvanic corrosion resistant treatment is performed on an outer circumferential surface of the collar that is brought into contact with the second chassis member.

* * * * *